United States Patent [19]

Kovaleski

[11] Patent Number: 4,482,340
[45] Date of Patent: Nov. 13, 1984

[54] LOW-FRICTION THIN-HUB PLASTIC MULTI-PART SHEAVE

[75] Inventor: Joseph J. Kovaleski, Easton, Conn.

[73] Assignee: Wyrepak Industries, Inc., Bridgeport, Conn.

[21] Appl. No.: 425,482

[22] Filed: Sep. 28, 1982

[51] Int. Cl.³ ............................................. F16H 55/36
[52] U.S. Cl. .................................. 474/180; 474/190; 29/159 R
[58] Field of Search ............... 474/180, 190, 191, 168; 29/159 R; 384/148

[56] References Cited

U.S. PATENT DOCUMENTS 2,632,333  3/1953  Eller ................................. 474/180 X
3,633,432  1/1972  Horsey ............................. 474/190 X

FOREIGN PATENT DOCUMENTS 2313153  10/1973  Fed. Rep. of Germany .

Primary Examiner—James A. Leppink
Assistant Examiner—Frank H. McKenzie, Jr.
Attorney, Agent, or Firm—H. Gibner Lehmann; K. Gibner Lehmann

[57] ABSTRACT

A low-friction thin-hub plastic multi-part sheave for handling wire, has two joined disc-like members with conical rim portions which together form a V-groove for the wire. The members have apertured central hub portions provided with facing shoulders that engage cooperable, oppositely-facing shoulders on the outer race member of an anti-friction bearing assemblage, to hold the latter captive between the disc-like members. The central hub portions and anti-friction bearing assemblage have respective, oppositely-facing, parallel exposed side surfaces which are flush and disposed in spaced-apart parallel planes, making for a thin hub assemblage. The cooperable, oppositely-facing shoulders are preferably conical, and the disc-like members have large, shallow circular recesses in their exposed sides whereby cutting-off a rim portion of one member will enable it to nest in the recess of an adjoining, similar but uncut disc-like member so that a plurality of sheaves with cut rim portions can be mounted in tandem on a common shaft and require but little space.

13 Claims, 7 Drawing Figures

Fig. 6

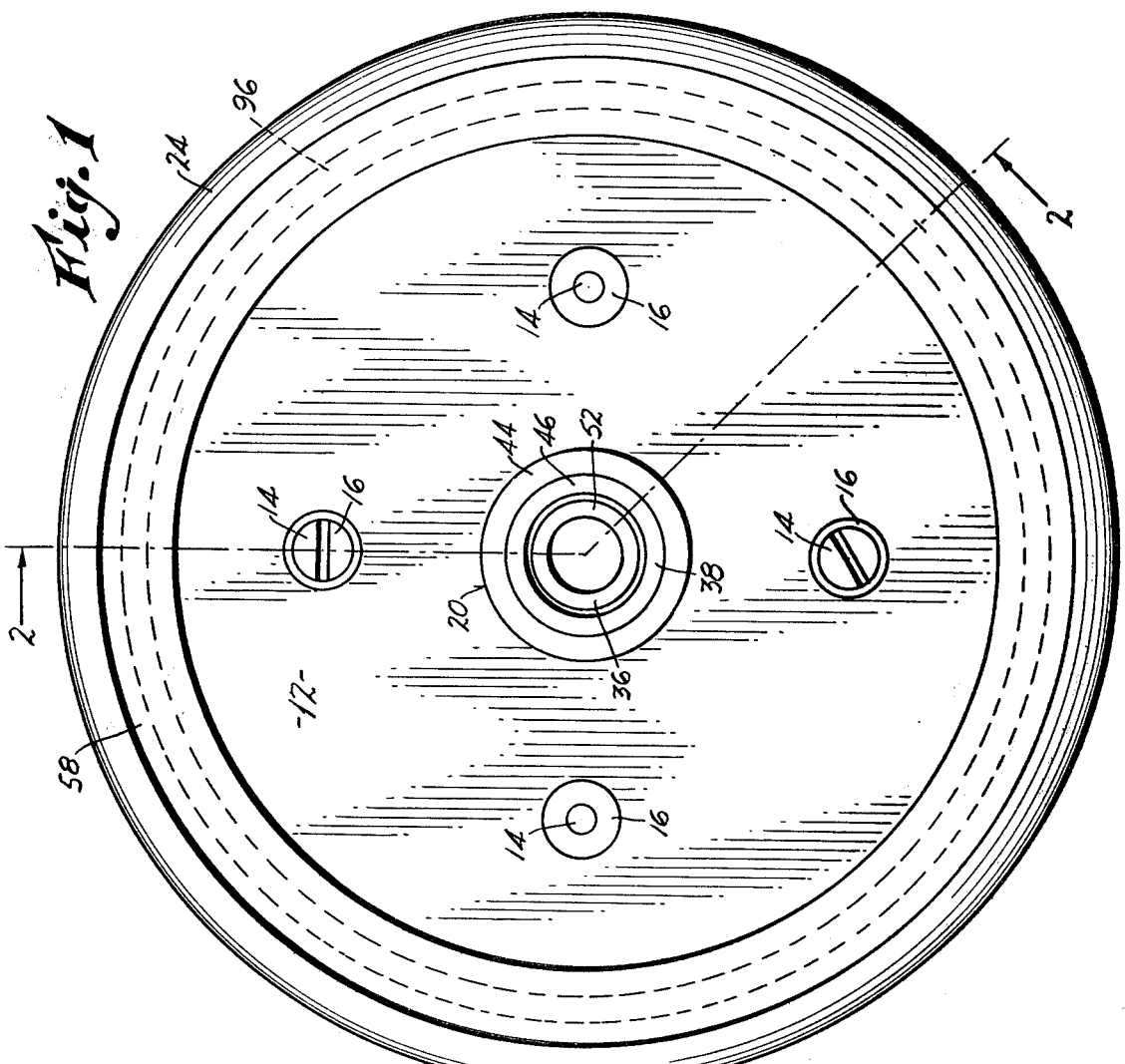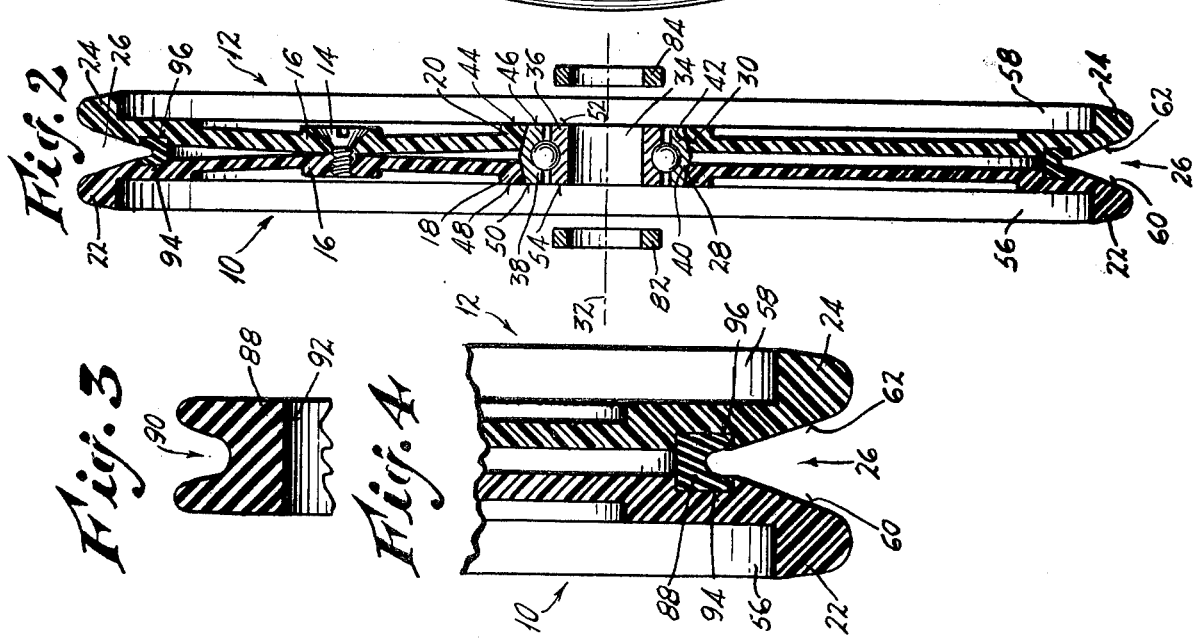

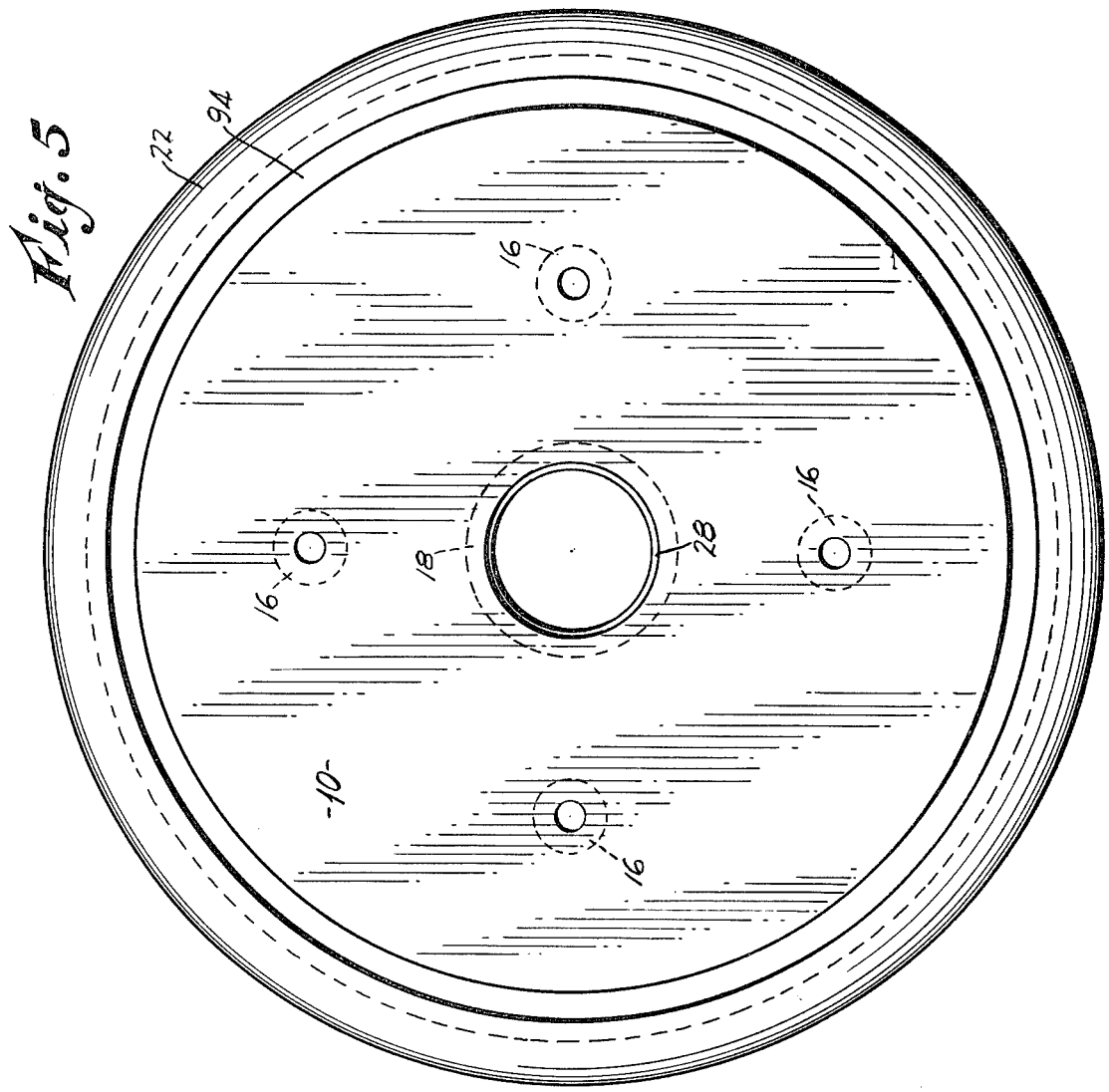
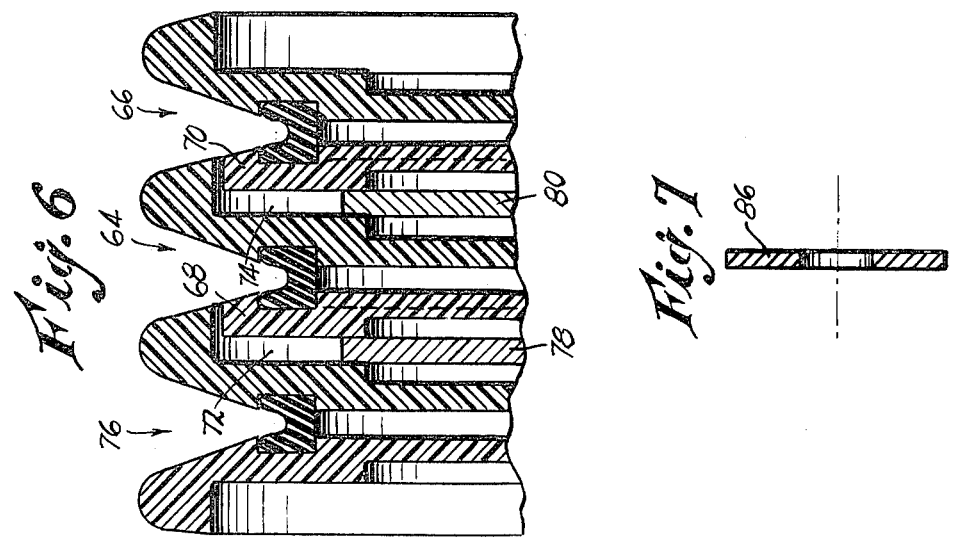

LOW-FRICTION THIN-HUB PLASTIC MULTI-PART SHEAVE

CROSS REFERENCES TO RELATED APPLICATIONS

1. Copending application of Joseph J. Kovaleski Ser. No. 06/373,325 filed Apr. 30, 1982 and entitled RUBBER-LAGGED SHEAVE.

BACKGROUND

This invention relates to plastic, multi-part pulleys or sheaves that are provided with special, wear-resistant or friction surfaces intended to handle wire and like strand material, and more particularly to sheaves of this type which can be produced inexpensively and yet are of exceptionally high quality.

In my copending application above referred to I provide an improved sheave that is lagged with rubber or rubber-like material and comprises two disc-like members disposed broadside to each other and secured together to form an annular V-groove for receiving and guiding wire or like material. In the V-groove a rubber wear strip is held captive, and the hub portions of the disc-like members enclose a ball-bearing assemblage by which a low-friction bearing is had on the shaft or spindle. The rubber wear strip is cut from a length of extruded strip stock, and the ends are butted, forming a joint at one spot on the periphery of the sheave.

When a number of such sheaves are disposed in tandem on a common shaft and in close juxtaposition, the overall axial length of the assemblage can sometimes be in excess of the available space that is alloted, due to the width of the peripheral V-groove rim portions and also the width of the hub portions which mount the anti-friction bearing. It is not possible to arrange for a nesting of one sheave with an adjoining sheave to save or reduce the space on the spindle, and a certain amount of spacing is always necessary to prevent touching or rubbing of the sheaves.

The cutting of the rubber lagging strip required a careful, somewhat precise operation even with the employment of suitable sizing jigs or fixtures, and slight variations in the length would show up in the finished product and impair the appearance even though performance was not adversely affected.

Other prior sheaves for handling wire and like strands were not, to my knowledge, provided with rubber wear strips in the bottom portions of the V-grooves and did not have the wear-resistant advantages which come from the use of rubber or similar resilient substances arranged to be engaged by the strand material. Nor did these prior sheaves l end themselves to quick and easy replacement of the lagging substance in many instances, particularly where they were located in inaccessible spots.

The construction of prior sheaves involved tooling and assembly operations which brought up the fabricating cost unnecessarily, especially where a certain amount of labor was involved. In present-day products, labor-intensive components or assemblages are diligently avoided, wherever possible.

SUMMARY

The disadvantages of prior lagged sheave constructions are obviated by the present invention, and one object of the invention is to provide an improved low-friction, plastic multi-part rubber-lagged sheave which is especially compact and thin, measured axially, whereby a plurality of sheaves can be carried on a common shaft in a relatively small space.

Another object of the invention is to provide an improved, rubber-lagged sheave as above set forth, which is particularly inexpensive to produce.

A further object of the invention is to provide an improved multi-part sheave construction in accordance with the foregoing, which enables the nesting of adjoining sheaves one in the other by means of a simple modification of the rim structure.

A feature of the invention is the provision of an improved, rubber-lagged sheave as above characterized, which has an especially thin hub construction, measured axially.

Another feature of the invention is the provision of an improved sheave of the kind outlined, wherein simple and secure means are provided for holding the anti-friction bearing assemblage captive in the hub structure.

Still another object of the invention is to provide an improved rubber-lagged sheave as above set forth, wherein the lagging element can be endless yet easily and economically fabricated and applied or replaced.

In accomplishing the above objects the invention provides a low-friction thin-hub plastic multi-part sheave for handling wire and like strands, comprising a pair of disc-like members having apertured, central hub portions and having peripheral rim portions, the latter being adapted to form a V-groove in which the wire that is to be handled, is received. The central hub portions have opposed facing shoulder surfaces that cooperate with shoulder surfaces provided on the outer periphery of the outer bearing race member of the anti-friction bearing, apart from side surfaces of the race member. Such side surfaces of the race member remain exposed and uncovered, and are flush with end faces of the hubs on the members of the sheave whereby the thickness of the hub portion of the sheave is essentially the same as the axial dimension of the bearing assemblage. In consequence, the sheave hub portion is reduced to the absolute minimum in thickness, measured axially.

In addition, each of the disc-like members of the sheave has a large circular recess in its outer face, and has a sloped surface on its rim portion, which is coextensive with radially outermost surfaces of the recesses, to the end that cutting off of a circular part of one rim portion of a disc-like member at the sloped surface thereof enables said member to be nested in the recess of an adjoining identical but un-cut member. This nesting construction enables a plurality of sheaves to be mounted in tandem on a common shaft in a manner to require the least amount of space, measured axially. Moreover, with such nesting the sheaves can have either common rotation one with the other, or else independent rotation in which latter case the sheaves will not rub against each other to cause unwanted drag or pull. By the use of suitable spacer washers between adjoining sheaves, either greater or else lesser spacing can be had, according to specific requirements.

The cooperable shoulders between the anti-fraction bearing assemblage and the disc-like members of the sheave are preferably conical in shape, although other configurations are possible according to the invention.

The rubber wear element can be economically molded in the form of an endless ring which is removable from the mold by pulling it out of the cavity. Due to the resilience of the ring, undercut portions will yield during such removal, without difficulty.

Still other features and advantages will hereinafter appear.

In the accompanying drawings, illustrating one embodiment of the invention:

FIG. 1 is a side elevational view of the improved sheave construction as provided by the invention.

FIG. 2 is a sectional view, taken on the line 2—2 of FIG. 1.

FIG. 3 is a fragmentary section, enlarged, of the rubber or rubber-like wear strip of the sheave.

FIG. 4 is an enlarged section of a portion of the sheave taken at the periphery, illustrating the structure in better detail.

FIG. 5 is a side elevational view of one of the disclike members of the sheave. The other member is identical, and the surface shown is the inside.

FIG. 6 is a fragmentary section, enlarged, of a plurality of sheaves mounted in tandem on a common shaft (not shown). The section is taken through peripheral portions of the sheaves.

FIG. 7 is a diametric section of a spacer washer for use when sheaves are mounted in tandem and intended to turn as a unit.

Referring first to FIGS. 1-4, the present improved sheave is seen to be constituted of two disc-like members 10, 12 which are secured together by means of screws 14 passing through bosses 16 which have their holes in alignment. The disc-like members 10, 12 have apertured central hub portions 18 and 20 respectively, and have peripheral rim portions 22, 24 which together form a V-groove 26 in which the wire (not shown) that is to be handled, is received.

In accordance with the present invention, the central hub portions 18 and 20 are constituted in a unique manner, being provided with shoulder surfaces 28, 30 that are opposed, that is, facing towards each other. The surfaces 28, 30 are preferably conical, as shown, and are thus directed almost radially inward or toward the axis of the sheave. These surfaces have axial components insofar as the forces on them are concerned, due to their angularity with respect to the axis 32 as can be seen in FIG. 2.

Held captive by the hub portions 18, 20 of the disclike members 10, 12 is an anti-friction bearing assemblage designated generally by the numeral 34. The bearing assemblage 34 has an inner race member 36 and an outer race member 38 which engage ball bearings of usual construction. According to the invention the outer race member 38 is provided on its outer periphery with oppositely-acting annular shoulder surfaces 40, 42 which are cooperable with the shoulder surfaces 28, 30 of the hub portions 18, 20 of the disc-like members 10, 12 for the purpose of accurately positioning the bearing assemblage 34 and securely holding it captive. This unique construction enables the end surfaces of the hub portions and end surfaces of the bearing race members to be flush with each other, making for a thin hub structure of the sheave which saves space axially. Referring to FIGS. 1 and 2 it will be seen that the end face 44 of the hub 20 and the end face 46 of the outer bearing race member 38 are flush, as are also the end faces 48 and 50 of the hub 18 and race member 38. As is usual, the end faces of the bearing assemblage 34 are also flush with each other, these being the face 46 of the outer race member 38 and the face 52 of the inner race member 36 as visible in FIG. 1. The opposite faces 50 and 54 of the bearing race members are flush also, as shown in FIG. 2. All such end faces are seen to lie in two, spaced-apart radial planes that are normal to the axis 32 of the sheave.

The disc-like members 10 and 12 of the sheave can be identical with each other, as shown, whereby but a single mold will be required to form them of plastic material.

Further, in accordance with the present invention, the members 10 and 12 are provided with large circular recesses 56 and 58 in their outer surfaces for a purpose now to be described. The rim portions 22 and 24 of the disc-like members have sloped surfaces 60 and 62 which are coextensive with the radially outermost surfaces of the recesses 56 and 58 respectively whereby a cutting off of a circular part of one rim portion (22 or 24) at the cylindrical wall of the large circular recess will result in part of the sloped surface (either 60 or 62) associated therewith, to remain, thereby enabling a plurality of sheaves to be mounted in tandem on a common spindle. Such tandem arrangement is illustrated in FIG. 6, wherein two sheaves 64 and 66 have parts of the rims of members 68 and 70 thereof cut off, enabling these sheaves and more specifically, the members 68 and 70 to nest in recesses 72 and 74 of sheaves 76 and 64 respectively. By such nesting arrangement a number of sheaves can be mounted on a common shaft in tandem and require relatively little room, measured axially, and this is an important feature of the present invention. Contributing to this compact construction is the thin nature of the hub portions of the sheaves, as will now be understood.

In FIG. 6, spacer washers 78 and 80 are shown, engaged with the disc-like members to maintain the desired spacing between the respective sheaves. It is considered that the sheaves 64, 66 and 76 are intended to rotate simultaneously in the same directions and at the same speed, in FIG. 6. However, the sheaves can rotate independently by utilizing smaller spacer washers, such as the washers 82 and 84 shown in FIG. 2, which engage the inner race member 36 of the bearing assemblage 34 instead of the disc-like members. Or, somewhat larger washers such as the washer 86 illustrated in FIG. 7 can be employed, for engagement with the bearing and the hub portions of the disc-like members where independent turning of the sheaves is not required.

As provided by the invention, a wear-resistant endless ring 88 of rubber or rubber-like material is held captive in the V-groove 26 of the sheave. The ring has an outer, annular groove 90 and a cylindrical inner surface 92, and is held captive in two circular grooves 94 and 96 of the disc-like members of the sheave. Due to the resilient nature of the ring 88 it can be readily molded in a simple cavity having undercuts and stripped therefrom after the molding, since the walls of the groove 90 will readily yield to permit such removal. Replacement of the wear ring 88 can be easily accomplished by removing the four screws 14 to enable separation of the disc-like members 10 and 12, as can be understood.

In the assembly of the sheave, the screws 14 distort the disc-like members as the screws are pulled up tight, this being shown in FIG. 2. Such distortion places the members under continual stress, and insures that the bearing assemblage 34 will be at all times securely retained in proper position in the hub portion of the sheave. Also, in consequence, the wear ring 88 will at all times be securely held captive in the rim portion of the sheave.

It will now be seen from the foregoing that I have provided an improved low-friction thin-hub plastic multi-part sheave for handling wire and similar strand materials, which has a number of advantages. A plurality of such sheaves can be nested on a common spindle in a manner to occupy a minimum of space axially, by merely cutting off rim portions from each sheave to be nested. The resultant V-grooves of the nested sheaves are in part made up of two rim portions, one from each of adjoining sheaves. The sheaves have especially thin hub portions, and yet securely retain anti-friction bearing assemblages in proper alignment. Simple spacer means can be employed, by which the sheaves when tandem-mounted will not rub against each other but instead are freely moveable, independently of each other. The structures involved are especially simple and inexpensive to fabricate and assemble, making for low-cost manufacture.

Variations and modifications are possible without departing from the spirit of the claims.

I claim:

1. A low-friction thin-hub plastic multi-part sheave for handling wire, comprising in combination:
   (a) a pair of disc-like members having apertured, central hub portions with oppositely disposed annular end faces, and having peripheral rim portions,
   (b) said peripheral rim portions being adapted to form a V-groove in which the wire, which is to be handled, is received,
   (c) said central hub portions having opposed, inwardly facing annular shoulder surfaces,
   (d) an anti-friction bearing having inner and outer race members and roller elements engaged with said race members,
   (e) the outer race member of the bearing having oppositely facing, parallel exposed annular side surfaces and having an outer periphery and oppositely-acting outwardly facing annular shoulder surfaces on its outer periphery which are separate from said parallel exposed side surfaces,
   (f) the opposed, inwardly facing surfaces of the hub portions engaging the oppositely-acting annular shoulder surfaces of the outer race member to hold the bearing captive in said hub portions,
   (g) the parallel exposed annular side surfaces of the outer race member of the bearing being substantially completely flush with the respective opposite end faces of the said hub portions, whereby a series of similar hub-bearing assemblages can be disposed in close side-by-side relation, without encountering interference from one another,
   (h) fasteners disposed radially outwardly of the hub portions of the disc-like members, for holding the members together, said fasteners effecting an inward bowing of the disc-like members and forcing the opposed, inwardly facing annular shoulder surfaces of the hub portions into firm engagement with the outwardly facing annular shoulder surfaces on the outer race member of the bearing,
   (i) the outer race member of the bearing maintaining an annular space between the disc-like members in the vicinity of the hub portions thereof such that looseness or play between the hub portions and outer race of the bearing is eliminated.

2. The invention as defined in claim 1, wherein:
   (a) the end faces of the central hub portions of each of the disc-like members lie in substantially parallel radial planes,
   (b) said inner race member having oppositely facing, parallel exposed side surfaces which are substantially flush with the said end faces respectively, of the central hub portions.

3. The invention as defined in claim 1, wherein:
   (a) the opposed, facing shoulder surfaces of the central hub portions are substantially conical.

4. The invention as defined in claim 1, wherein:
   (a) each of the disc-like members has a face and a large circular recess in its face, each recess having a radially outermost surface, each disc-like member having a sloped surface on its rim portion, which is coextensive with the radially outermost surfaces of its recess whereby cutting off of a circular part of one rim portion of a disc-like member at the sloped surface thereof enables said member to be nested in the recess of an adjoining identical, un-cut member.

5. The invention as defined in claim 4, and further including:
   (a) an additional sheave of the type characterized in claim 4, having a cut-off rim portion on one of the disc-like members which is nested in the circular recess of an adjoining, uncut disc-like member.

6. The invention as defined in claim 5, and further including:
   (a) a spacer washer disposed between the sheaves and engageable with the anti-friction bearings thereof so as to enable the peripheral rim portions of adjacent disc-like members to form part of one face of a second V-groove, which is adjacent to the first-mentioned V-groove.

7. The invention as defined in claim 5, and further including:
   (a) a spacer washer disposed between the sheaves and engageable with portions of the disc-like members that are disposed radially outwardly of the said bearings, so as to enable peripheral rim portions of adjacent members to form part of one face of a second wire-receiving groove, which is adjacent to the first-mentioned wire-receiving groove.

8. A low-friction thin-hub plastic multi-part sheave for handling wire, comprising in combination:
   (a) a pair of disc-like members having peripheral rim portions and central hub portions,
   (b) said peripheral rim portions being adapted to form one wall of a V-groove in which the wire, which is to be handled, is received,
   (c) an anti-friction bearing disposed at and carried by the central hub portions of the disc-like members,
   (d) one of the disc-like members having a large circular recess in its face and two sloped surfaces on its rim portion, one of which forms a part of said wall of the V-groove, the said one sloped surface meeting the radially outermost surfaces of the recess,
   (e) the other of said disc-like members having a sloped surface, which together with the said one surface of the first disc-like member constitutes essentially said one wall of the said V-groove,
   (f) the diameter of the said other disc-like member being less than that of the circular recess in the face of the said one disc-like member, such that the other member can nest substantially entirely within the confines of the said recess.

9. The invention as defined in claim 8, and further including:

(a) a third disc-like member having a peripheral rim portion,
(b) the said third disc-like member having a sloped surface, cooperable with the said one sloped surface of the said one of the pair of disc-like members and with the sloped surface of the other disc-like member, the sloped surface of the third disc-like member constituting essentially the other wall of the said V-groove.

10. The invention as defined in claim 9, wherein:
(a) the said other of said disc-like members has a circular groove adjacent its periphery,
(b) said third disc-like member having a similar circular groove adjacent its periphery, and facing said first circular groove, and
(c) a wear strip received in said circular grooves and disposed between the said other disc-like member and the third disc-like member,
(d) said wear strip forming the bottom surface of the said V-groove.

11. A low-friction thin-hub plastic multi-part sheave for handling wire, comprising in combination:
(a) a pair of disc-like members having apertured, central hub portions with oppositely disposed annular end faces, and having peripheral rim portions,
(b) said peripheral rim portions being adapted to form a V-groove in which the wire, which is to be handled, is received,
(c) said central hub portions having opposed, inwardly facing annular shoulder surfaces,
(d) an anti-friction bearing having inner and outer race members and roller elements engaged with said race members,
(e) the outer race member of the bearing having oppositely facing, exposed annular side surfaces and having an outer periphery and oppositely-acting outwardly facing annular shoulder surfaces on its outer periphery which are separate from said parallel exposed side surfaces,
(f) the opposed, inwardly facing shoulder surfaces of the hub portions engaging the oppositely-acting annular shoulder surfaces of the outer race member to hold the bearing captive in said hub portions,
(g) the inwardly facing annular shoulder surfaces of the hub portions being constituted substantially as intersecting sectors of two conical surfaces, the bases of the conical surfaces facing in an axially inward direction, whereby improved retention of the said outer race member of the bearing between the hub portions is realized.

12. A low-friction thin-hub plastic multi-part sheave for handling wire, comprising in combination:
(a) a pair of disc-like members having apertured, central hub portions with oppositely disposed annular end faces, and having peripheral rim portions,
(b) said peripheral rim portions being adapted to form a V-groove in which the wire, which is to be handled, is received,
(c) said central hub portions having opposed, inwardly facing annular shoulder surfaces,
(d) an anti-friction bearing having inner and outer race members and roller elements engaged with said race members,
(e) the outer race member of the bearing having oppositely facing, exposed annular side surfaces and having an outer periphery and oppositely-acting outwardly facing annular shoulder surfaces on its outer periphery which are separate from said exposed side surfaces,
(f) the opposed, inwardly facing shoulder surfaces of the hub portions engaging the oppositely-acting annular shoulder surfaces of the outer race member to hold the bearing captive in said hub portions,
(g) the outwardly facing annular shoulder surfaces of the outer race member of the bearing being constituted substantially as intersecting sectors of two conical surfaces, the bases of the cones facing in an axially inward direction, whereby improved retention of the said outer race member of the bearing between the hub portions is realized.

13. A low-friction thin-hub plastic multi-part sheave for handling wire, comprising in combination:
(a) a pair of disc-like members disposed broadside to each other and having apertured, central hub portions with oppositely disposed external annular end faces, and having peripheral rim portions,
(b) said peripheral rim portions being adapted to form a V-groove in which the wire, which is to be handled, is received,
(c) said central hub portions having opposed, inwardly facing annular shoulder surfaces,
(d) an anti-friction bearing having inner and outer race members and roller elements engaged with said race members,
(e) the outer race member of the bearing having oppositely facing, exposed annular side surfaces and having an outer periphery and oppositely-acting outwardly facing annular shoulder surfaces on its outer periphery which are separate from said exposed side surfaces,
(f) the opposed, inwardly facing shoulder surfaces of the hub portions being cooperable with and engaging the oppositely-acting annular shoulder surfaces of the outer race member to hold the bearing captive in said hub portions,
(g) the oppositely-disposed external annular end faces of the hub portions being disposed in spaced-apart planes essentially containing the said exposed annular side surfaces of the outer race member of the bearing whereby a plurality of said sheaves can be closely stacked.

* * * * *